United States Patent
Isoshima

(10) Patent No.: US 8,854,932 B2
(45) Date of Patent: Oct. 7, 2014

(54) HEAD-GIMBAL-ASSEMBLY CAPABLE OF INHIBITING EFFECTS OF DETERIORATION IN LATERAL BALANCE OF HEAT-ASSISTED MAGNETIC RECORDING HEAD

(75) Inventor: Nobuyuki Isoshima, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 14/009,691

(22) PCT Filed: Apr. 25, 2011

(86) PCT No.: PCT/JP2011/060083
§ 371 (c)(1),
(2), (4) Date: Oct. 23, 2013

(87) PCT Pub. No.: WO2012/147151
PCT Pub. Date: Nov. 1, 2012

(65) Prior Publication Data
US 2014/0050056 A1 Feb. 20, 2014

(51) Int. Cl.
*G11B 11/00* (2006.01)
*G11B 5/48* (2006.01)
*G11B 13/08* (2006.01)

(52) U.S. Cl.
CPC .............. *G11B 13/08* (2013.01); *G11B 5/4826* (2013.01); *G11B 5/4853* (2013.01); *G11B 5/4866* (2013.01)
USPC ..................................... 369/13.33; 369/13.13

(58) Field of Classification Search
None
See application file for complete search history.

(56) References Cited

U.S. PATENT DOCUMENTS

| 8,467,276 B2* | 6/2013 | Hirata et al. ............... 369/13.33 |
| 8,537,646 B2* | 9/2013 | Hirata et al. ............... 369/13.33 |
| 8,542,559 B2* | 9/2013 | Hirata et al. ............... 369/13.33 |
| 8,614,933 B2* | 12/2013 | Schreck et al. ............ 369/13.33 |
| 8,638,645 B1* | 1/2014 | Nishijima et al. ......... 369/13.33 |
| 2004/0184361 A1* | 9/2004 | Ichihara et al. ............ 369/13.33 |
| 2007/0159720 A1 | 7/2007 | Sohn et al. |
| 2010/0097716 A1* | 4/2010 | Furukawa et al. ......... 369/13.33 |

FOREIGN PATENT DOCUMENTS

| JP | 2007-188619 A | 7/2007 |
| JP | 2007-335027 A | 12/2007 |
| JP | 2009-301597 A | 12/2009 |
| JP | 2010-027185 A | 2/2010 |

* cited by examiner

*Primary Examiner* — Tan X Dinh
(74) *Attorney, Agent, or Firm* — Mattingly & Malur, PC

(57) ABSTRACT

There is provided a head-gimbal-assembly for use in heat-assist magnetic recording, excellent in the heat-release characteristic of a laser diode, by inhibiting effects of deterioration in lateral balance, and wind turbulence without adversely affecting efforts to lower a profile of a magnetic disk unit. For this purpose, a sub-mount with a laser diode attached thereto is mounted on either of the right and left lateral faces of a head slider. Further, of two lengths of lead wires for power supply to the laser diode, one length of the lead wire is routed to a lateral face of the head-slider, on the opposite side of a lateral face with the sub-mount attached thereto, after circling around the outer periphery of a head-slider electrode, formed on the gas-outlet side of the head slider.

6 Claims, 12 Drawing Sheets

HEAD-GIMBAL-ASSEMBLY CAPABLE OF INHIBITING EFFECTS OF DETERIORATION IN LATERAL BALANCE OF HEAT-ASSISTED MAGNETIC RECORDING HEAD

TECHNICAL FIELD

The invention relates to a head-gimbal-assembly, a head assembly, and a magnetic disk unit, and in particular, to a mount-structure for a thermal assisted magnetic recording head.

BACKGROUND ART

A magnetic disk unit is now in general use as a storage unit of a personal computer. Further, the range of uses of the magnetic disk unit is recently being expanded to a car navigation system, a video-ready TV, and so forth. With these devices, capacities of data, and images, to be treated, tend to be further increased. As a result, a concomitant increase in storage capacity is required of the magnetic disk unit. In order to increase the storage capacity of the magnetic disk unit with an enclosure remaining on the same order in size as that in the case of the related art, there is a need for enhancement in the recording density of recording media.

A heat-assist magnetic recording method has been proposed as one of technologies for implementing enhancement in the recording density of a magnetic disk. With the heat-assist magnetic recording method, a magnetic field and heat are applied to a micro-region of recording media to thereby record data at a high density. In this connection, a near field transducer is generally used as a device for heating the micro-region of the recording media. The near field transducer is disposed in the vicinity of a magnetic write head mounted in a head slider, thereby converting light guided from an external laser diode into near field light to be subsequently outputted.

In Patent Document 1, there is disclosed a thermal assisted magnetic recording head according to a method whereby a sub-mount incorporating a laser diode in a recess is mounted on the surface of a head slider. A Gimbal is attached to the thermal assisted magnetic recording head, and these are swingably supported by a load beam.

In Patent Document 2, there is disclosed a thermal assisted magnetic recording head in which a laser diode having a linear optical cavity is provided on a lateral face of a head slider to receive light guided from the laser diode from the lateral face side of the head slider.

CITATION LIST

Patent Literature

Patent Document 1: Japanese Unexamined Patent Application Publication No. 2007-335027
Patent Document 2: Japanese Unexamined Patent Application Publication No. 2010-27185

SUMMARY OF INVENTION

Technical Problem

With the heat assist magnetic recording head according to Patent Document 1, however, since a distance from the center of oscillation of the load beam up to the surface of the head-slider, opposed to recording media, becomes greater as compared with the case of supporting only the head-slider over the load beam. For this reason, a problem arises in that an increase in positional deviation of the magnetic write head will occur when the head is subjected to wind turbulence to be tilted. Furthermore, an increase in the distance will become a stumbling block at the time of lowering the profile of the enclosure of a magnetic disk unit. In the case of a magnetic disk unit in which a plurality of recording media are mounted in the coaxial direction, in particular, the increase in the distance becomes a stumbling block for an attempt to lower the profile of the enclosure of the magnetic disk unit.

Meanwhile, with the thermal assisted magnetic recording head according to Patent Document 2, the laser diode having the linear optical cavity is provided on either of the right and left lateral faces of the head slider. In this case, a resonance direction of the laser diode is a direction orthogonal to the longitudinal direction of the head slider. Accordingly, the thermal assisted magnetic recording head according to Patent Document 2 undergoes an increase in size in the lateral direction of a head assembly, thereby becoming susceptible to the effect of wind turbulence. Further, owing to this structure, rotation moment around the center axis, in the lateral direction of the head assembly, is prone to occur to the head. For this reason, stability in the posture of the head is liable to deteriorate.

Further, in the case of Patent Document 2, the number of lead wires that are routed by taking a detour on the right side, and the left side of the head slider, respectively, will no longer coincide with each other. That is, there occurs an increase in an area of either one of right and left traces, in pairs, provided with a plurality of lead wires mounted on an insulating material. As a result, the rotation moment occurs, and stability of the head is liable to deteriorate due to the effect of wind turbulence.

Solution to Problem

Accordingly, in the case of the present invention, a sub-mount with a laser diode attached thereto is mounted on either of the right and left lateral faces of a head slider such that the main resonance direction of the laser diode is oriented in the longitudinal direction of a head assembly.

Further, of two lengths of lead wires for power supply to the laser diode, one length of the lead wire is routed so as to circle around the outer periphery of a head-slider electrode, disposed on the gas-outlet side of the head slider, and to take a detour on a lateral face of the head-slider, on the opposite side of a lateral face with the sub-mount attached thereto, while the other length of the lead wire is routed on the side of a lateral face of the head-slider, on the same side as the lateral face with the sub-mount attached thereto, without circling around the outer periphery of the head-slider electrode.

Advantageous Effects of Invention

In the case of the present invention, it is possible to do away with the need for mounting the laser diode and the sub-mount between the load beam and the head slider. Accordingly, the distance from the center of oscillation of the load beam up to the surface of the head-slider, opposed to the recording media, can be reduced. Furthermore, the head can do without causing an increase in the size of the head assembly, in the lateral direction, so that the stability of the head can be enhanced.

Still further, of the two lengths of the lead wires for power supply to the laser diode, one length each can be routed on both the right and left lateral face sides of the head slider. By so doing, the number of the lead wires that are routed on both the right and left sides of the head slider can be equalized, so that respective areas of right and left traces, in pairs, can also be equalized. As a result, occurrence of the rotation moment can be suppressed, and stability of the head can be enhanced.

The above and other problems, configurations, and effects of the present invention will be apparent from the following detailed description of the preferred embodiments of the invention.

DESCRIPTION OF EMBODIMENTS

The embodiments of the invention are described hereinafter with reference to the accompanying drawings. Further, it is to be understood that the embodiments of the invention be not limited to any of the embodiments described hereunder by way of example and that various changes and modifications may be made in the invention without departing from the spirit and scope thereof. Furthermore, for the sake of clarity in description, omission and simplification, as appropriate, are made in the following description of the embodiments of the invention, and the drawings. Still further, in each of the drawings, like elements are denoted by like signs, and for the sake of clarity in description, duplication in description is omitted as appropriate.

(Overall Configuration of Magnetic Disk Drive)

Figure 1:
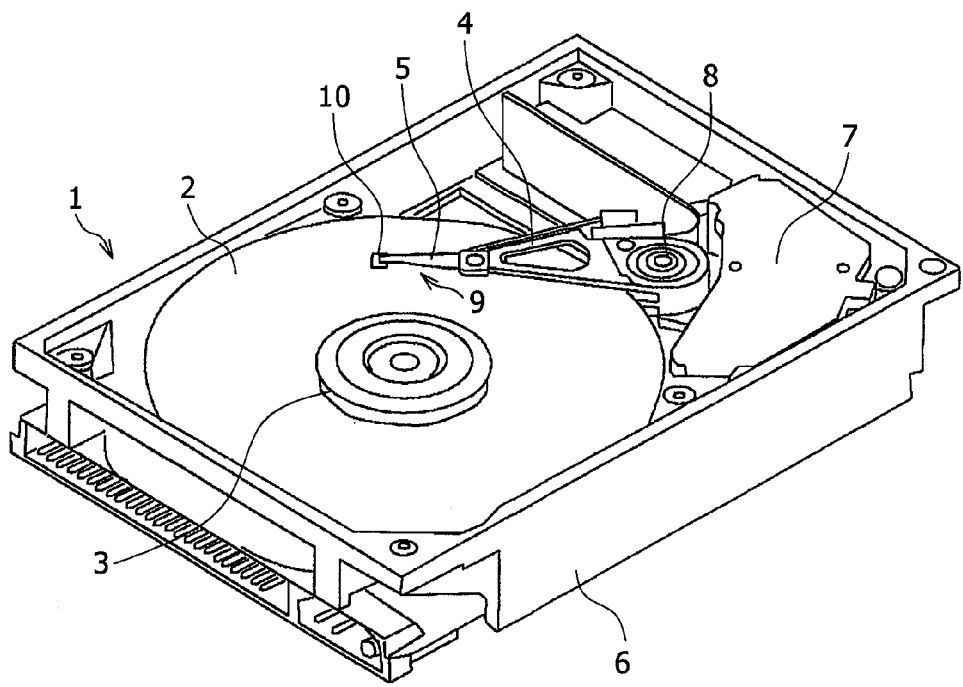
FIG. 1 is an external view of a magnetic disk unit according to an embodiment of the invention, showing a state with an enclosure cover removed.

The overall configuration of a magnetic disk unit 1 with a head-gimbal-assembly according to an embodiment of the invention, applied thereto, is described with reference to FIG. 1. In the figure, depiction of a top cover of the magnetic disk unit 1 is omitted.

Mechanistic constituent elements of the magnetic disk unit 1 are housed in an enclosure 6. In the enclosure 6, there are housed magnetic disk media 2 serving as recording media for recording data, and a drive mechanism of a head assembly 9 in which a head-gimbal-assembly 10 for use in accessing (reading/writing of data) to the magnetic disk media 2 is mounted.

The magnetic disk media 2 are attached to a spindle motor 3 fixed to the bottom surface of the enclosure 6. The magnetic disk media 2 are rotationally driven at a predetermined angular velocity by the spindle motor 3. In FIG. 1, the magnetic disk media 2 are rotationally driven counterclockwise.

A head assembly 9 is supported by the tip of an actuator assembly 4. The actuator assembly 4 is assembled such that one end side thereof is rotatable in both directions, centering round a rotation axis 8. The actuator assembly 4 is rotatably driven by a voice coil motor 7.

The head assembly 9 is made up of a suspension 5, and the head-gimbal-assembly 10. The suspension 5 is assembled on the tip side of the actuator assembly 4. Herein, the suspension 5 functions as a plate-spring. The head-gimbal-assembly 10 is attached to the tip of the suspension 5.

The head assembly 9 is evacuated to outside of the magnetic disk media 2 at the time of non-accessing. However, the head assembly 9 may be evacuated to an inner peripheral region of the magnetic disk media 2 at the time of non-accessing.

At the time of accessing, the head-gimbal-assembly 10 will be in a state where a good balance is maintained between a pressure caused by the viscosity of air present between the head-gimbal-assembly 10 and the magnetic disk media 2 and a pressure applied by the suspension 5, toward the magnetic disk media 2. More specifically, the head-gimbal-assembly 10 will be in a state of levitation above the surface of the magnetic disk media 2.

The respective constituent elements mounted in the enclosure 6 are controlled by a control circuit on a circuit board (not shown). The circuit board may be mounted inside the enclosure 6, or may be present outside the enclosure 6.

(Configuration of Head Assembly)

Figure 2A:
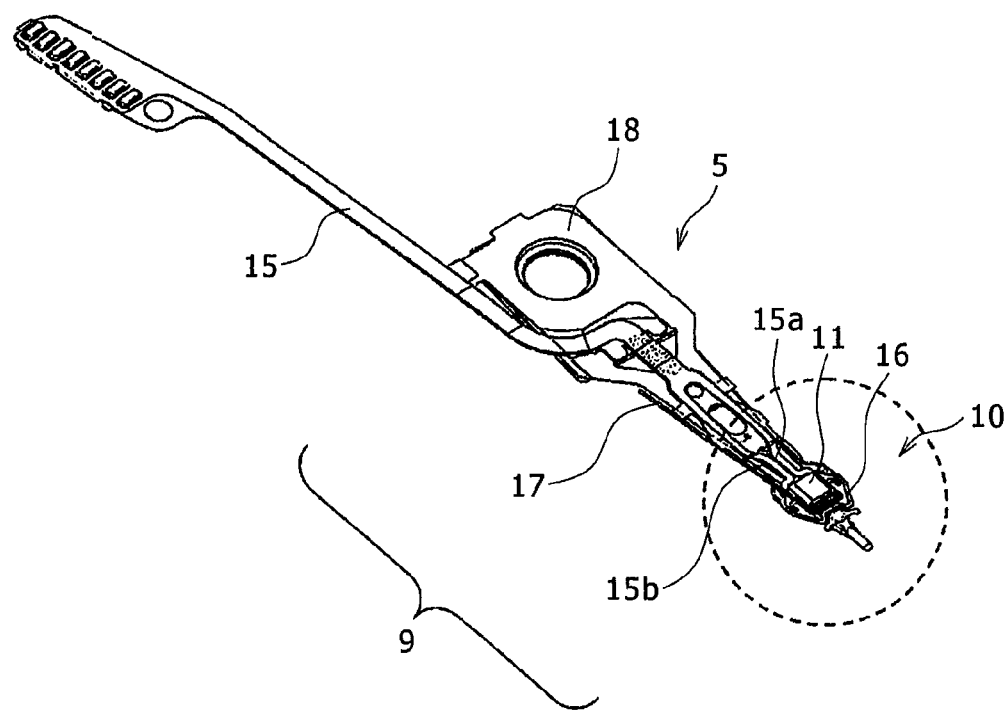
FIG. 2A is a perspective view of a head assembly according to the embodiment of the invention.

Next, the configuration of the head assembly 9 is described by way of example. FIG. 2A is a perspective view showing the overall configuration of the head assembly 9. FIG. 2A is a view of the head assembly 9, as seen from a side of the magnetic disk unit 1, adjacent to the magnetic disk media 2. More specifically, the view depicts a surface of the head assembly 9, opposed to the magnetic disk media 2.

Figure 2B:
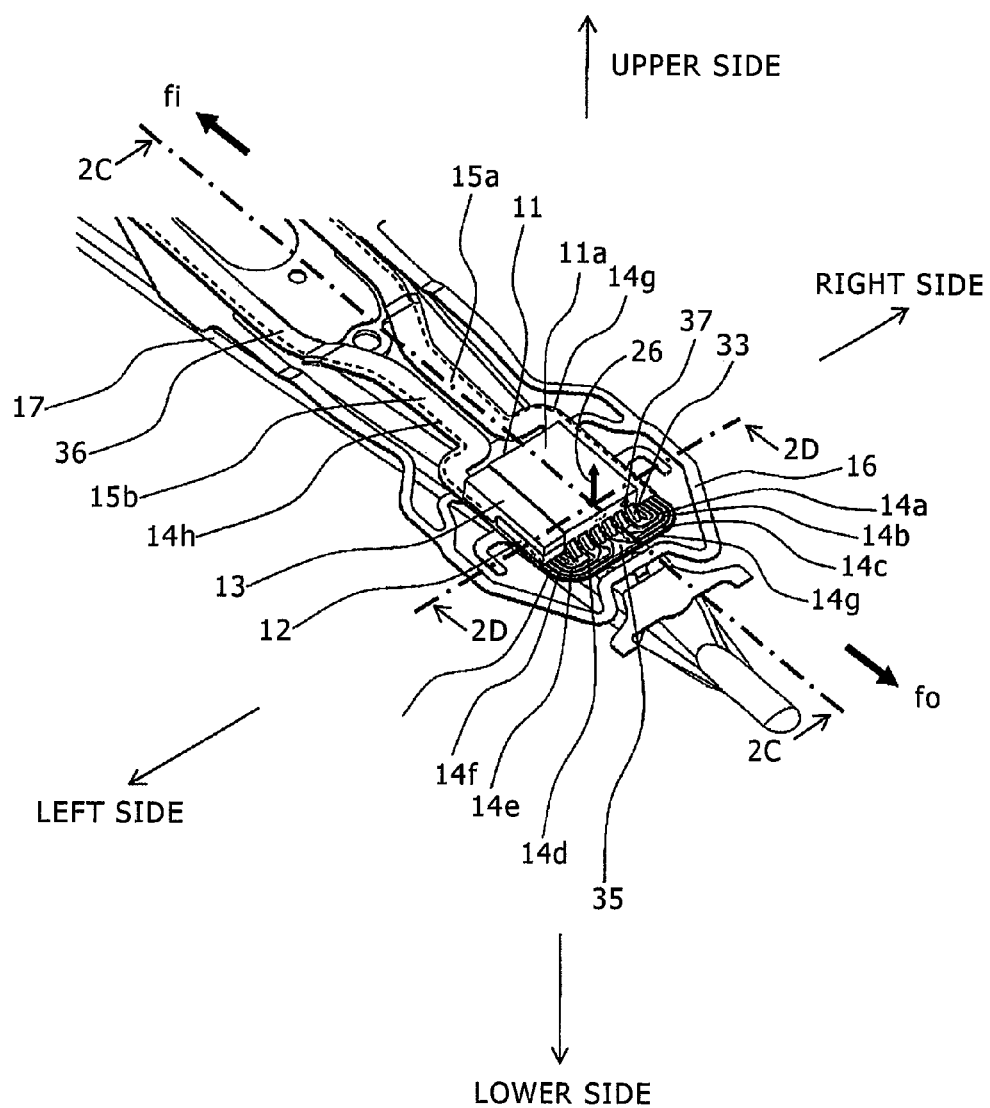
FIG. 2B is an enlarged perspective view of a head-gimbal-assembly according to the embodiment of the invention.
Figure 2C:
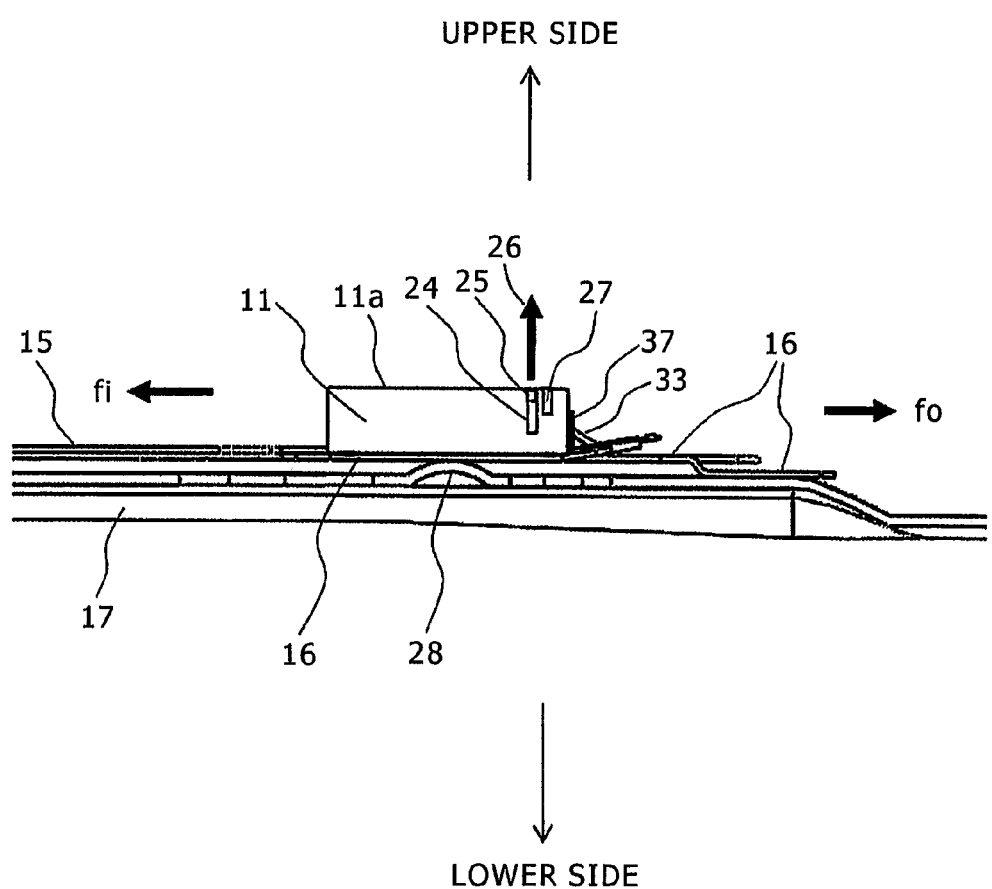
FIG. 2C is an enlarged side view of the head-gimbal-assembly according to the embodiment of the invention.
Figure 2D:
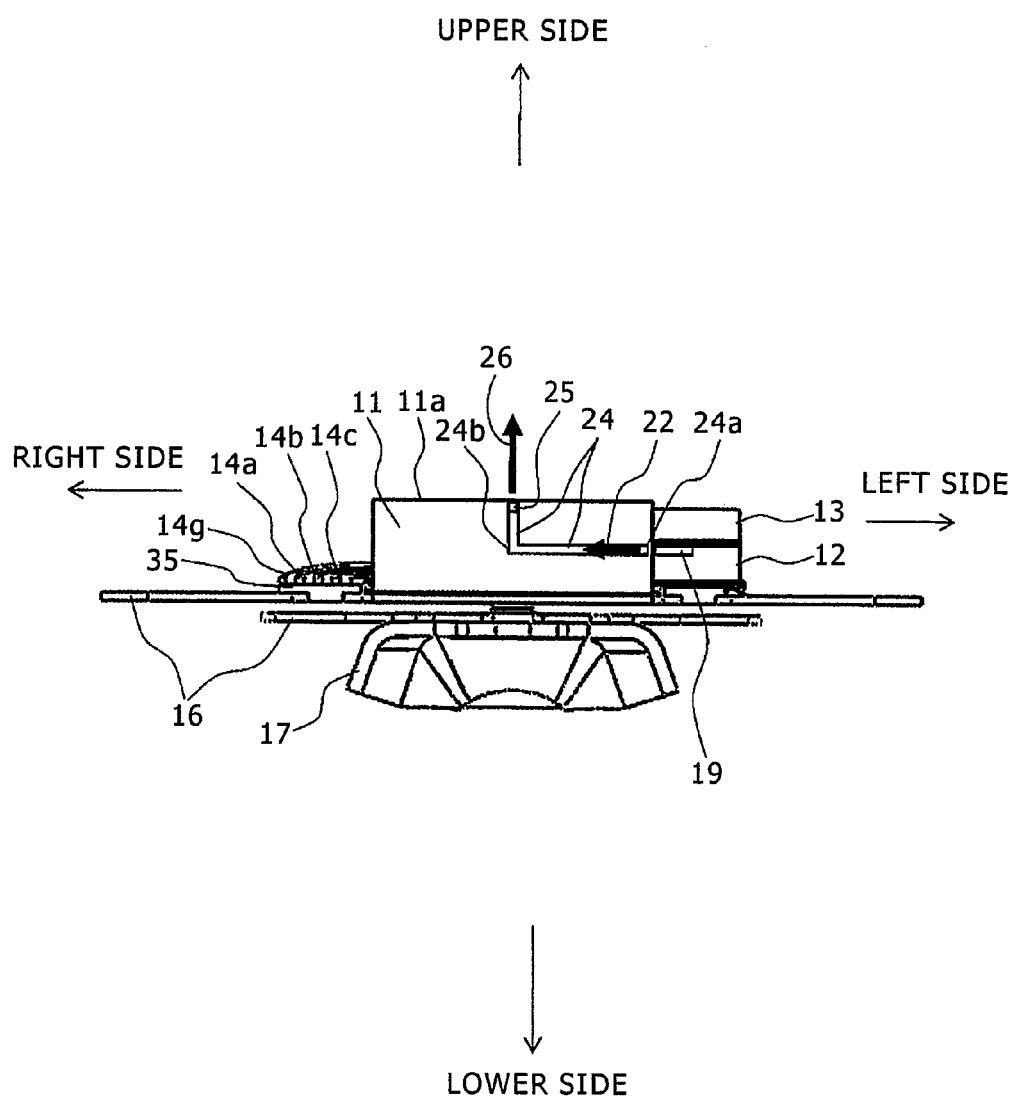
FIG. 2D is an enlarged sectional view of the head-gimbal-assembly according to the embodiment of the invention.

FIG. 2B is an enlarged view showing a part in FIG. 2A, delineated by a circle. FIGS. 2C, 2D each are a view obtained by cutting the head-gimbal-assembly 10 along respective virtual lines in FIG. 2B. Further, in these figures, a side of the head-gimbal-assembly 10, where a load beam 17 is disposed, is shown as a lower side, and a side thereof, where a thermal assisted magnetic recording head slider (hereinafter referred to as "a head slider") 11 is installed, is shown as an upper side. Further, in the figure, an arrow fo indicates an outlet side of a gas flow, and an arrow fi indicates an inlet direction of the gas flow. In the present description, a direction of the arrow fo is called forward, and a direction of the arrow fi is called backward.

As shown in FIG. 2A, the head assembly 9 is made up of the suspension 5, and the head-gimbal-assembly 10. The suspension 5 is provided with a trace 15 (15a, 15b) incorporating a plurality of lengths of lead wires, a gimbal 16, the load beam 17, and a mount plate 18. The head-gimbal-assembly 10 is made up of the head slider 11, and the gimbal 16 supporting the head slider 11.

The load beam 17 is a precision thin-sheet spring, formed of stainless steel (SUS), and so forth. The load beam 17 is higher in rigidity than the gimbal 16. The load beam 17 has spring characteristics, causing a load to occur to the head slider 11 by virtue of the spring characteristics. The gimbal 16 is supported on the load beam 17. The gimbal 16 is formed of stainless steel (SUS).

The gimbal 16 is resiliently supported on the upper surface of the load beam 17. More specifically, the gimbal 16 is capable of freely tilting. The posture of the slider 11 can be controlled by tilting of the gimbal 16. The trace 15 with a plurality of lead wires 14a to 14h routed thereon is formed on the upper surface of the gimbal 16. The trace 15 is bifurcated into two traces 15a, and 15b on the forward side thereof.

In the case of the present embodiment, four lengths of the lead wires 14a, 14b, 14c, and 14g are routed on the trace 15a on the right side. Meanwhile, four lengths of the lead wires 14d, 14e, 14f, and 14h are routed on the trace 15b on the left side. The six lengths of the lead wires 14a to 14f among these eight lengths of the lead wires are for use in head slider electrodes 37. Remaining two lengths of the lead wires, that is, 14g and 14 are for use in a sub-mount electrode and a laser diode electrode.

In this connection, six pieces of the head slider electrodes 37 corresponding to the six lengths of the lead wires 14a to 14f, respectively, are disposed on the forward side of the head slider 11. More specifically, the six pieces of the head slider electrode 37 are disposed on the lateral face of the head slider 11, on the gas-outlet side thereof. Accordingly, the lead wires 14a, 14b, 14c, in a group, are routed from the backward side of the head slider 11 to advance forward after taking a detour on the right side thereof to be subsequently connected to the electrodes corresponding thereto, respectively.

Further, the lead wires 14d to 14f, in a group, are routed from the backward side of the head slider 11 to advance forward after taking a detour on the left side thereof, to be subsequently connected to the electrodes corresponding thereto, respectively. As shown in FIG. 2B, the respective lead wires 14d to 14f pass the underside of a sub-mount 13 to be routed on the forward side of the head slider 11. A contact of the laser diode electrode and a contact of the sub-mount electrode are provided on the bottom side of the sub-mount 13.

In this connection, the respective terminals of the lead wires 14g and 14h are electrically separated from each other, however, if the respective terminals are virtually extended in the front-back direction, the lead wires 14g and 14h would be connected to each other as if one length of lead wire were formed, whereupon a wiring pattern thereof, including the other lead wires 14a to 14f, would be laterally symmetrical.

In the case of the present embodiment, the lead wire 14g is routed from the backward side of the head slider 11 to advance forward after taking a detour on the right side thereof, further taking a detour around the respective outer peripheries of all the lead wires 14a to 14f before being connected to the laser diode disposed on the left lateral side of the head slider 11. On the other hand, the lead wire 14h is routed from the backward side of the head slider 11 to take a detour on the left side thereof before being connected to the sub-mount electrode.

The head slider 11 is fixed to the gimbal 16, on a side of the head slider 11, adjacent to the same plane as the trace 15 is formed. A dimple 28 protruding upward is formed in a part of the region of the load beam 17, opposed to the head slider 11. The dimple 28 is formed upward so as to be higher by a step than a portion of the load beam 17, around the dimple 28. The load beam 17 comes into contact with the gimbal 16 at the dimple 28. More specifically, the gimbal 16 is supported by the dimple 28. The head slider 11 and the gimbal 16 are swingable centering around the dimple 28 owing to this structure.

The sub-mount 13 with a laser diode 12 attached thereto is fixed to one of the lateral faces of the head slider 11. In FIGS. 2A to 2D, the sub-mount 13 is fixed to the left lateral face of the head slider 11. The sub-mount 13 is formed so as to resemble the letter inverted-L in a lateral face shape. In the case of FIGS. 2A to 2D, respectively, the sub-mount 13 is formed so as to have a thin wall thickness on the forward side thereof, while having a heavy wall thickness on the backward side thereof.

Figure 3:
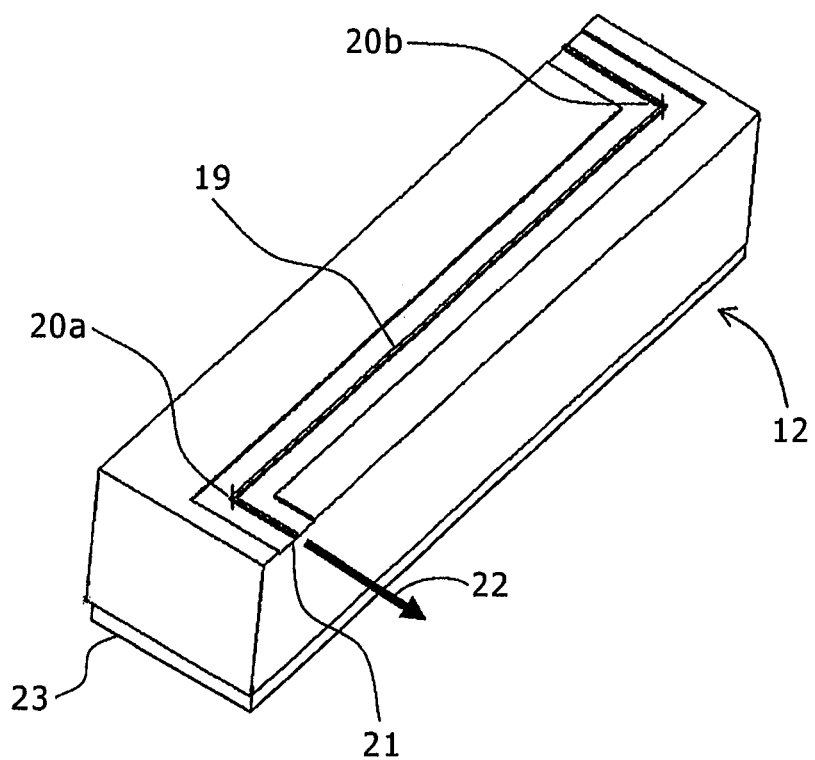
FIG. 3 is a perspective view for describing a structure of a laser diode according to the embodiment of the invention.

In FIG. 3, a structure of the laser diode is shown by way of example. FIG. 3 is a perspective view in which a lateral face of the laser diode 12, to be joined to the sub-mount 13, is shown as the top surface. The laser diode 12 is joined to a portion of the sub-mount 13, small in wall thickness.

As shown in FIG. 3, an optical cavity 19 for oscillating laser light 22 has two corners 20a, 20b, provided in a resonance path. A mirror structure is formed in each of the corners 20a, 20b. As the mirror structure is present, the laser light 22 outgoes from an output end 21 provided on the lateral face of the laser diode 12. The laser light 22 is outputted in the direction orthogonal to the longitudinal direction of the laser diode 12.

A laser diode electrode 23 is formed on one of lateral faces of the laser diode 12, on the opposite side of a lateral face of the laser diode 12, with the optical cavity 19 formed therein. In FIG. 3, the laser diode electrode 23 is formed on the bottom side of the laser diode 12. Upon electric power being supplied to the laser diode electrode 23 through the lead wire 14g, the laser light 22 is emitted.

Figure 4:
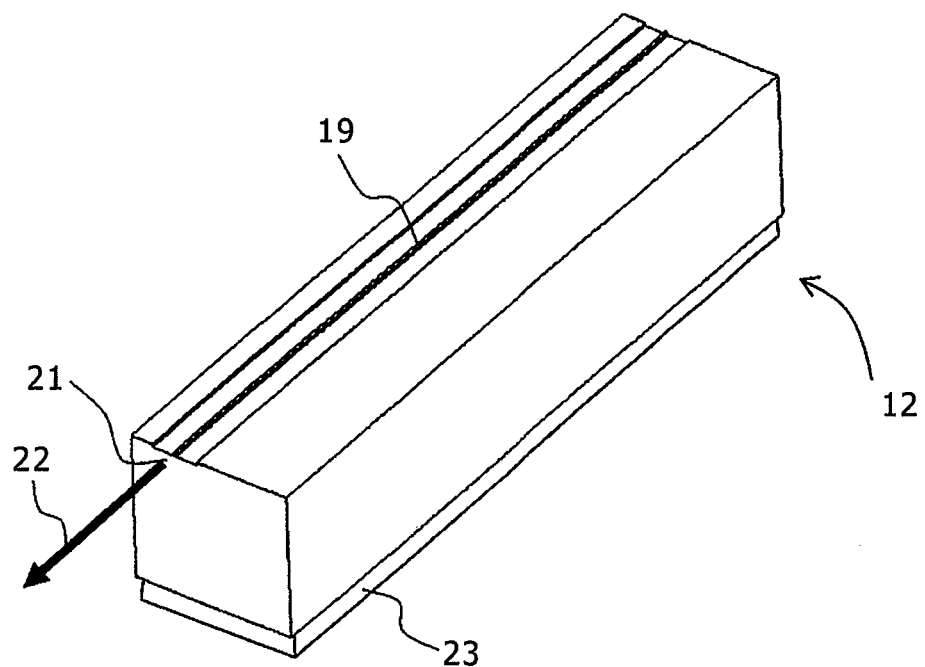
FIG. 4 is a perspective view for describing the structure of a common laser diode.

FIG. 3 indicates the case where the two corners are provided, however, the number of the corners is not limited thereto. The number of the corners may be either one or not less than three. In FIG. 4, the structure of a common laser diode 12 is shown for reference. With the common laser diode, the optical cavity 19 is formed in a linear shape, and laser light 22 is emitted in the longitudinal direction of the laser diode.

Referring back to the description of the laser diode 12 shown in FIG. 3, with the present embodiment, the laser light 22 emitted from the laser diode 12 falls on a waveguide 24 provided in the head slider 11 via a waveguide inlet 24a provided in a lateral face of the head slider 11, as shown in FIG. 2D.

Thereafter, a travelling direction of incident laser light is bent upward at a bend 24b to be subsequently guided to an opposite surface 11a via another waveguide 24. The opposite surface 11a is a surface of the head slider 11, at a position opposite to the magnetic disk media 2. A near field transducer 25 is formed at a position in the head slider 11, in the vicinity of the opposite surface 11a (in the vicinity of the surface of the head slider 11). The laser light is converted into near field light 26 by the action of the near field transducer 25 to be emitted to the magnetic disk media 2.

The opposite surface 11a of the head slider 11 is provided with an ABS (Air Bearing Surface). For this reason, the head slider 11 is levitated owing to the wedge film effect of a gas present over the magnetic disk media 2 that rotates. Further, as shown in FIG. 2C, a magnetic write head 27 is mounted at an end part of the head slider 11 on the gas-outlet side fo thereof. The magnetic write head 27 is disposed in the vicinity of a near field light outgoing region. In this connection, a magnetic read head (not shown) as well is mounted in the head slider 11.

The near field transducer 25 has a near field transducer (not shown). The near field transducer causes the laser light 22 to be excited by plasmon resonance to thereby generate the near field light 26. The waveguide 24 may be of a probe-type with the cross-sectional area thereof being narrowed-down towards the lower end. The waveguide 24 is made of material having characteristics allowing the laser light to pass there-through, such as quartz, and so forth. The bend 24b may have a structure in which the waveguide 24 is bent at a given curvature, or a structure in which a mirror structure is formed.

The sub-mount 13 is made of material high in thermal conductivity against the laser diode 12, and small in thermal expansion coefficient, such as silicon, AlN, SiC, and so forth. The sub-mount 13 is fixedly attached to one of the lateral faces of the head slider 11 by use of an adhesive high in thermal conductivity, containing a metal filler, and so forth.

FIG. 2D shows an example where the sub-mount 13 is fixed to the left-side lateral face of the head slider 11; however, the layout of wiring and so forth may be laterally interchanged. More specifically, the sub-mount 13 may be fixed to the right-side lateral face of the head slider 11.

(Sub-mount Structure and Laser-Diode Mount-Structure)

Figure 5:
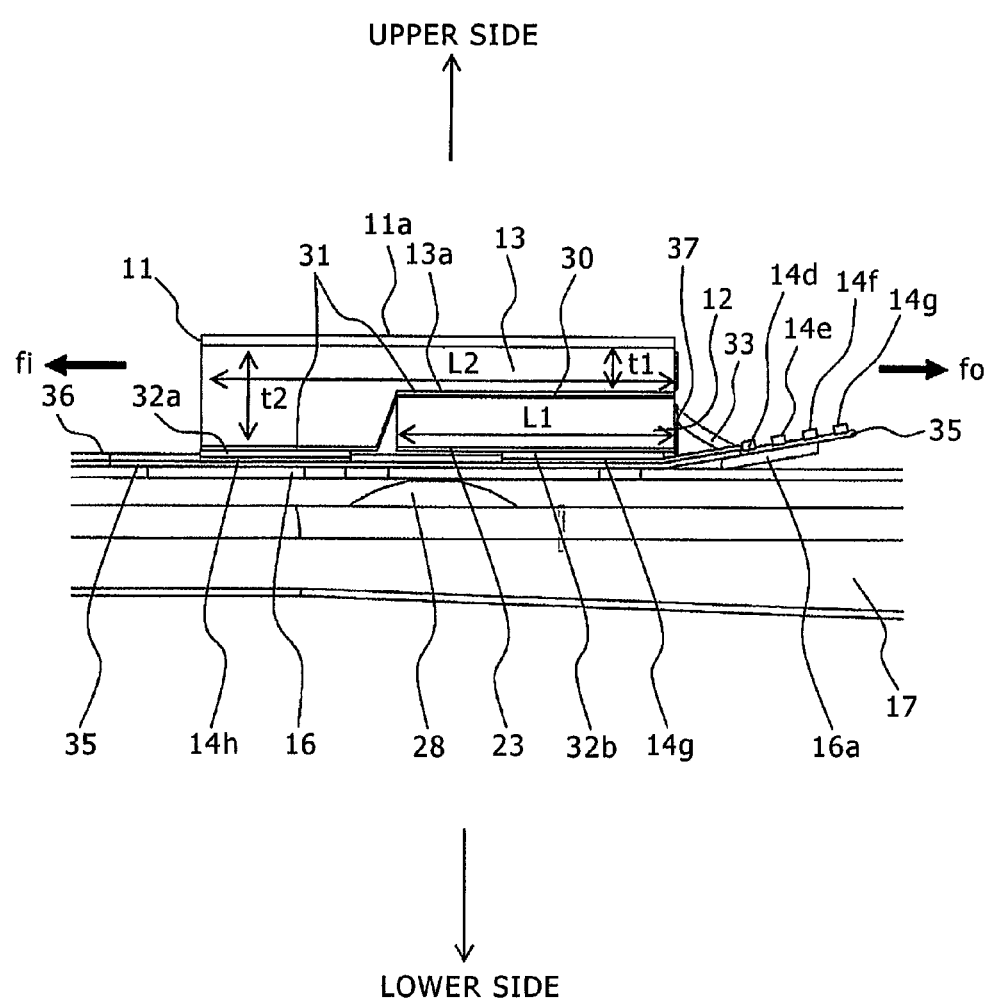
FIG. 5 is an enlarged view showing a structure for mounting the laser diode on a sub-mount.

FIG. 5 is a side view of the sub-mount 13 according to the present embodiment. Further, FIG. 5 is a side view showing the left-side lateral face of the head-gimbal-assembly 10. As shown in FIG. 5, a length L2 of the sub-mount 13, in the longitudinal direction thereof, is greater than a length L1 of the laser diode 12, in the longitudinal direction thereof. Still further, a thickness t1 of a portion of the sub-mount 13, with the laser diode 12 mounted thereon (in other words, on the gas-outlet side fo), is smaller than a thickness t2 thereof, on a gas inlet side fi. That is, the sub-mount 13 is formed so as to resemble the letter inverted-L in a lateral-face shape.

By forming the sub-mount 13 resembling the letter inverted-L, the sub-mount 13 can be joined with the laser diode 12, on two planes. With adoption of this structure, a joined area can be increased in size as compared with the case where the length of the sub-mount 13, in the longitudinal direction thereof, is about the same as the length of the laser diode 12 (namely, L1).

As a result of an increase in the joined area between the sub-mount 13 and the laser diode 12, heat generated at the laser diode 12 can be efficiently released to the sub-mount 13 or the head slider 11 in comparison with the case of a joint structure according to the related art. That is, a heat-release characteristic can be enhanced.

Furthermore, with the present embodiment, a joined face is on the two planes instead of one and the same plane. Accordingly, anti-shock property is enhanced in the case where a shock is applied from outside the magnetic disk unit 1.

Now, many parts of the head slider 11 are made of AlTiC relatively high in thermal conductivity. Further, in the case where the head slider 11 levitates from on the order of several nm to several tens of nm above the surface of the magnetic disk media 2, heat transfer coefficient between the magnetic disk media 2 and the opposite surface 11a is given at a value as high as several ten-thousands (W/m²·K).

Accordingly, for enhancement in heat-release characteristic as to the heat generated at the laser diode 12, it is effective to increase a heat quantity transferring between the sub-mount 13 and the head slider 11. In this connection, the thermal conductivity of an adhesive used for adhesion between the sub-mount 13 and the head slider 11 is small in value as compared with the cases of the sub-mount 13 and the head slider 11, respectively.

Meanwhile, in the case of the sub-mount 13 formed in the shape resembling the letter inverted-L, adopted in the present embodiment, an area bonded by use of an adhesive can be increased. Therefore, such a structure of the sub-mount 13 in the shape resembling the letter inverted-L as adopted in the present embodiment is suited to efficiently propagate the heat generated at the laser diode 12 to the head slider 11. As a result, it is possible to enhance the reliability of the thermal assisted magnetic recording head.

Further, in the case where the laser diode 12 is disposed on the lateral face side of the head slider 11, a distance from the center (the center of oscillation) of the dimple 28 provided in the load beam 17 up to the opposite surface 11a of the head slider 11 is equal to that in the case of the structure according to the related art, having no heat-assist mechanism. Accordingly, it is possible to prevent occurrence of a problem that the positional deviation of the magnetic write head 27 will increase when the head is subjected to wind turbulence to be tilted.

Further, in the case where the laser diode 12 is disposed on the lateral face side of the head slider 11, a thickness of the head-gimbal-assembly 10, in the vertical direction, is equal to that in the case of the structure according to the related art, without the heat-assist mechanism. Accordingly, an advantageous effect of preventing interference with lowering the profile of the enclosure 6 of the magnetic disk unit 1 can be hoped for in the case where a plurality of the magnetic disk media 2 are mounted in the coaxial direction, in particular.

Furthermore, in the case of the present embodiment, the longitudinal direction (the main resonance direction) of the laser diode 12 is in parallel with the lateral face of the head slider 11, and the laser light 22 falls on the head slider 11 via the corner 20a. Accordingly, in contrast to the case where the laser diode 12 is mounted on the gimbal 16 such that the main resonance direction will be a lateral direction, an installation width of the head slider 11 and the laser diode 12 (the sub-mount 13) can be rendered shorter, so that the rotation moment around the center axis, in the lateral direction, can be substantially reduced.

Accordingly, deterioration in the levitation properties of the head slider can be largely inhibited. Further, the levitation properties of the head-gimbal-assembly 10 can be corrected for by amending the ABS structure of the opposite surface 11a, opposite to the magnetic disk media 2.

(Connection Between Lead Wire and Electrode)

The face (the joined face) of the laser diode 12, for forming the optical cavity 19, is joined to the sub-mount 13. For joining, solder 30 is used. It is preferable to use Au—Sn solder having electrical conductivity and being extremely small in creep deformation as the solder 30.

A sub-mount electrode 31 for power supply to the laser diode 12 is formed on a joined face 13a of the sub-mount 13. The sub-mount electrode 31 is formed on not only the joined face 13a where the laser diode 12 is mounted, but also across the whole length in the longitudinal direction of the sub-mount 13. That is, the sub-mount electrode 31 is integrally formed on the entire joined face of the sub-mount 13 up to a part thereof, having the thickness t2, where the laser diode 12 is not mounted. A portion of the sub-mount electrode 31, corresponding to the part of the sub-mount 13, without the laser diode 12 mounted thereon, is connected to the lead wire 14h through the intermediary of a bonding agent 32a such as an electrically conductive adhesive or solder, and so forth. More specifically, the portion of the sub-mount electrode 31, corresponding to the part of the sub-mount 13, without the laser diode 12 mounted thereon, becomes a contact region between the lead wire 14h and the sub-mount electrode 31.

The laser diode electrode 23 formed on a face of the laser diode 12, on the opposite side of the face thereof, for use in mounting the laser diode 12 on the sub-mount 13, is connected to the lead wire 14g through the intermediary of a bonding agent 32b such as an electrically conductive adhesive or solder, and so forth. More specifically, the laser diode electrode 23 becomes a contact region with the lead wire 14g.

The laser diode 12 emits the laser light 22 upon power being supplied to the laser diode 12 via the two lead wires 14g, 14h, respectively.

As described previously, the six lengths of the lead wires 14a to 14f, besides the lead wires 14g, and 14h, for use in power supply to the laser diode 12, respectively, are routed up to the head-gimbal-assembly 10.

These six lengths of the lead wires 14a to 14f are each connected to the head slider electrode 37 from the gas-outlet side fo. Solder is used for connection between each of the lead wires 14a to 14f and the head slider electrode 37. The head slider electrode 37 is connected to the magnetic write head 27, the magnetic read head, and other elements, via wiring (not shown) inside the head slider 11.

The lead wires 14a to 14h, with the top-face side thereof (the surface-side thereof) in as-exposed state, are formed on a trace base member 35 on the forward side of the head slider 11. The trace base-member 35 is made of an insulating material such as polyimide, and so forth. In contrast, the top-face side (the surface-side) of each of the lead wires 14a to 14h, at other locations, is covered with a trace cover member 36. That is, these lead wires 14a to 14h are each under insulation protection by the trace cover member 36.

Of the eight lengths of the lead wires 14a to 14h, four lengths each of the lead wires are evenly disposed on the right and left sides of the head slider 11, respectively. Of the eight lengths of the lead wires, the lead wires 14a to 14c, and 14g are formed on the trace 15a on the right side of the trace 15. The remaining lead wires 14d to 14f, and 14h are formed on the trace 15b on the left side of the trace 15. These two lengths of the traces 15b, 15b are routed toward the gas inlet side to be finally merged together into one length of the trace 15, as shown in FIG. 2A.

As shown in FIG. 5, there is provided a structure in which a portion of each of the four lengths of the lead wires 14d to 14g, on the gas-outlet fo side of the head slider 11, is supported by a gimbal 16a from the back side of the trace base member 35. In FIG. 5, the gimbal 16a is formed so as to support a region of the trace base member 35, up to the back of the lead wire 14f at a position of a third length from the innermost side. That is, the gimbal 16a supports the trace base member from the back-side thereof. Accordingly, positioning can be facilitated at the time when the lead wires 14 are joined with the head slider electrodes 37, respectively, by use of solder 33 on the trace base member 35 that is soft and susceptible to deformation if used by itself.

A solid bonding ball (SBB) and solder jet are used for solder joint. In the case of using the solid bonding ball, soldering is performed through heating by use of laser light.
(Wiring Patterns for Lead Wires 14g and 14h)

Figure 6:
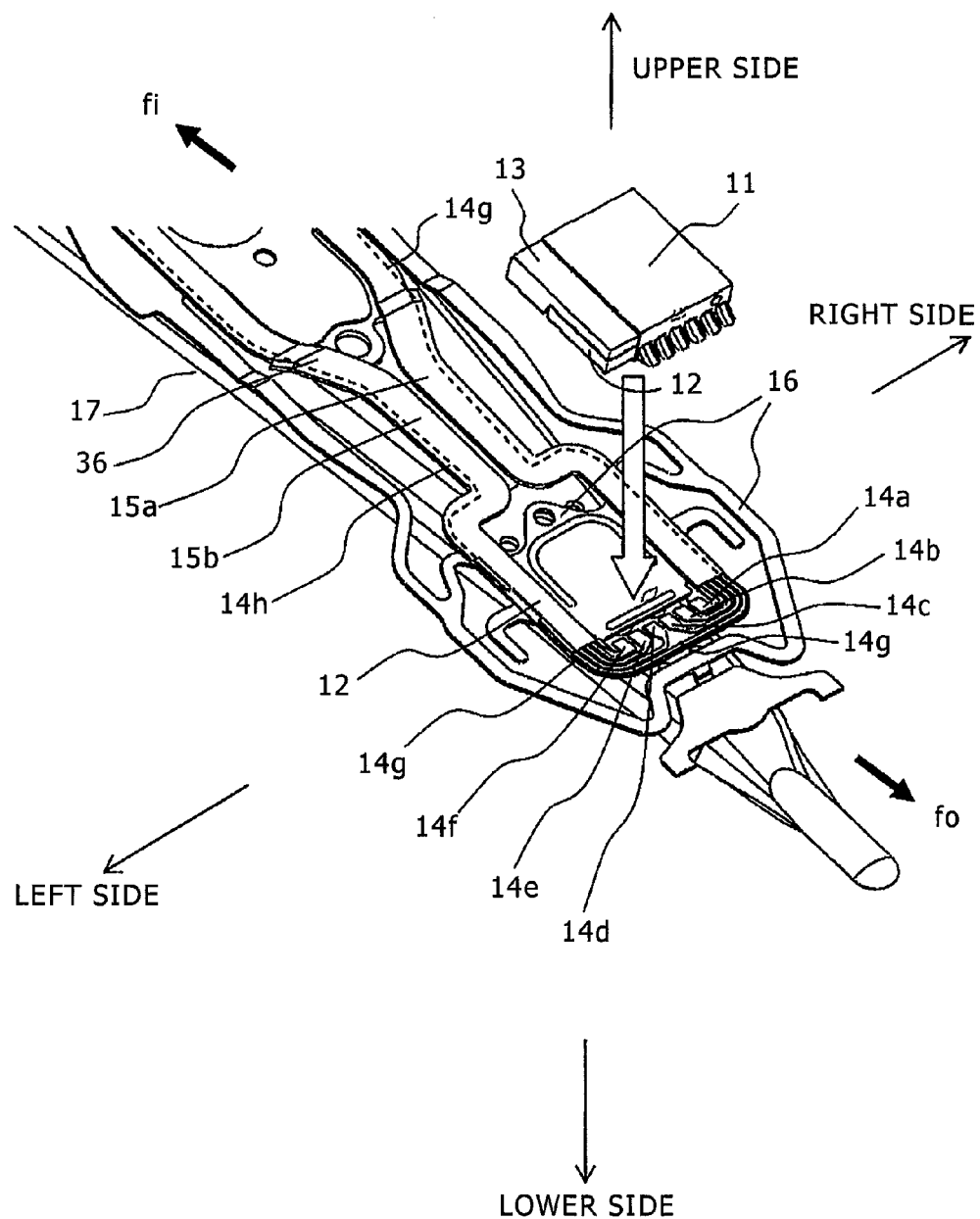
FIG. 6 is an assembly view of a tip structure of the head-gimbal-assembly according to the embodiment.

As shown in FIG. 6, either one of the lead wire 14g connected to the laser diode electrode 23, and the lead wire 14h connected to the sub-mount electrode 31 is routed in such a way as to circle around the head slider electrode 37, and the outer periphery of all the lead wires 14a to 14f. Further, the lead wire that is routed so as to circle around the outer peripheries of all the lead wires 14a to 14f is routed on the lateral face (the right-side) of the head slider 11, on the opposite side of the lateral face (the left-side) thereof, where the laser diode 12 is mounted to be subsequently routed toward the gas inlet side fi through the trace 15a.

The other of the lead wire 14g and the lead wire 14h is routed toward the gas inlet side fi through the trace 15b without being routed on the forward side of the head slider 11.

In the case of this embodiment, the lead wire 14g to be connected to the laser diode electrode 23 is routed so as to circle around the head slider electrode 37, and the respective outer peripheries of the lead wires 14a to 14f. On the other hand, the lead wire 14h to be connected to the sub-mount electrode 31 is routed to the trace 15b from the sub-mount electrode 31 present in a region where the laser diode 12 is not mounted.

Further, as to the lead wires 14a to 14f, two lengths of the wires, in pairs, are used for transmission of a recording signal, reproducing signal, levitation-amount adjust signal, and so forth. Of the six lengths of the lead wires 14a to 14f, the three lengths thereof are routed on the right side of the head slider 11 to be taken into the trace 15a, and the remaining three lengths thereof are routed on the left side of the head slider 11 to be taken into the trace 15b. In the present embodiment, the number of these lead wires is six lengths in total; however, the number of these lead wires may be other than that.

With this routing structure, the number of the lead wires in either the trace 15a or the trace 15b is the same, that is, four lengths. Accordingly, the trace 15a and the trace 15b can be formed such that respective pattern widths thereof are identical to each other in size. As a result, in the case of the present embodiment, there is no chance of a good balance in weight between the traces 15a, 15b being lost. As a result, in the case of the present embodiment, the head slider 11 is stabilized in weight balance, and tends to easily levitate above the magnetic disk media 2.

In FIG. 10 of Patent Document 2, pattern widths become asymmetrical, so that a good balance in weight between the traces 15a, 15b is lost. Naturally, it is difficult for the head slider 11 to stably levitate above the magnetic disk media 2.

Further, as to the two lengths of the traces 15a, 15b, the back sides thereof are supported by the gimbal 16; however, the traces 15a, 15b are not joined thereto. Accordingly, the two lengths of the traces 15a, 15b are generally susceptible to be oscillated due to wind turbulence caused by an air flow occurring inside the magnetic disk unit 1. Accordingly, from the standpoint of suppressing the wind turbulence, it is necessary to control an area per one length of the two lengths of the traces 15a, 15b. If the respective pattern widths of the trace 15a and the trace 15b are rendered identical to each other in size to be aligned with each other, as in the case of the present embodiment, the head slider 11 tends to stably levitate above the magnetic disk media 2 with ease.

For the lead wires 14g, and 14h, used in power supply to the laser diode 12, a copper wire high in thermal conductivity is used. Accordingly, heat generated at the laser diode 12 at the time of laser-light emission is propagated to the magnetic disk media 2 via not only the head slider 11 but also the lead wire 14g and the lead wire 14h, connected to the laser diode electrode 23 and the sub-mount electrode 31, respectively. More specifically, respective temperatures of the lead wires 14g, 14h, located far away from the laser diode 12, rise by the agency of heat conduction, whereupon heat is released into the air.

With the present embodiment, the lead wires 14g, 14h are mounted one by one in the individual traces 15a, 15b, respectively. Accordingly, a rise in temperature, due to heat conduction, will not be unevenly high in either of the traces 15a, 15b, so that a rise in temperature will be evened out between the two traces 15a, 15b.

In consequence, in the case of the present embodiment, a surface area for the two lengths of the traces 15a, 15b can be utilized for heat release by convective heat transfer into the ambient air. On the other hand, in the case of Patent Document 2, since the lead wires 14g, 14h are routed in only one of the traces, heat dissipation paths will be uneven. Actually, the surface area of the traces, available for heat release, is as large as a half of that in the case of the present embodiment.

Heat-release efficiency in the case of Patent Document 2 is therefore poor as compared with the present embodiment.

Thus, the structure of the head-gimbal-assembly 10 fosters the heat release of the laser diode 12, and is therefore advantageous in realization of a highly reliable thermal assisted magnetic recording head slider.

Furthermore, with the present embodiment, the lead wire 14g circles around the head slider electrode 37 that is present on the gas-outlet side fo of the head slider 11, and the respective outer peripheries of all the lead wires 14a to 14f. Accordingly, heat from the lead wire 14g at a higher temperature can be conducted to the other lead wires 14a to 14f via the trace base member 35. Further, heat generated from the laser diode 12 can be released toward the head slider 11 via the solder 33.

The lead wire 14g directly connected to the laser diode 12 becomes relatively higher in temperature than the lead wire 14h. Accordingly, the lead wire 14g directly connected to the laser diode electrode 23 is preferably selected for a lead wire circling around both the head slider electrode 37 that is present on the gas-outlet side fo of the head slider 11, and the respective outer peripheries of all the lead wires 14a to 14f.

Now, in FIG. 5, the gimbal 16a is formed so as to support the region of the trace base member 35, up to the back of the lead wire 14f at the position of the third length from the innermost side. However, the gimbal 16a may be formed to be extended up to a position outside the lead wire 14g (or the lead wire 14h) circling around the outermost periphery, on the gas-outlet side fo side of the head slider 11, through the intermediary of the trace base member 35, as shown in FIG. 7.

Figure 7:
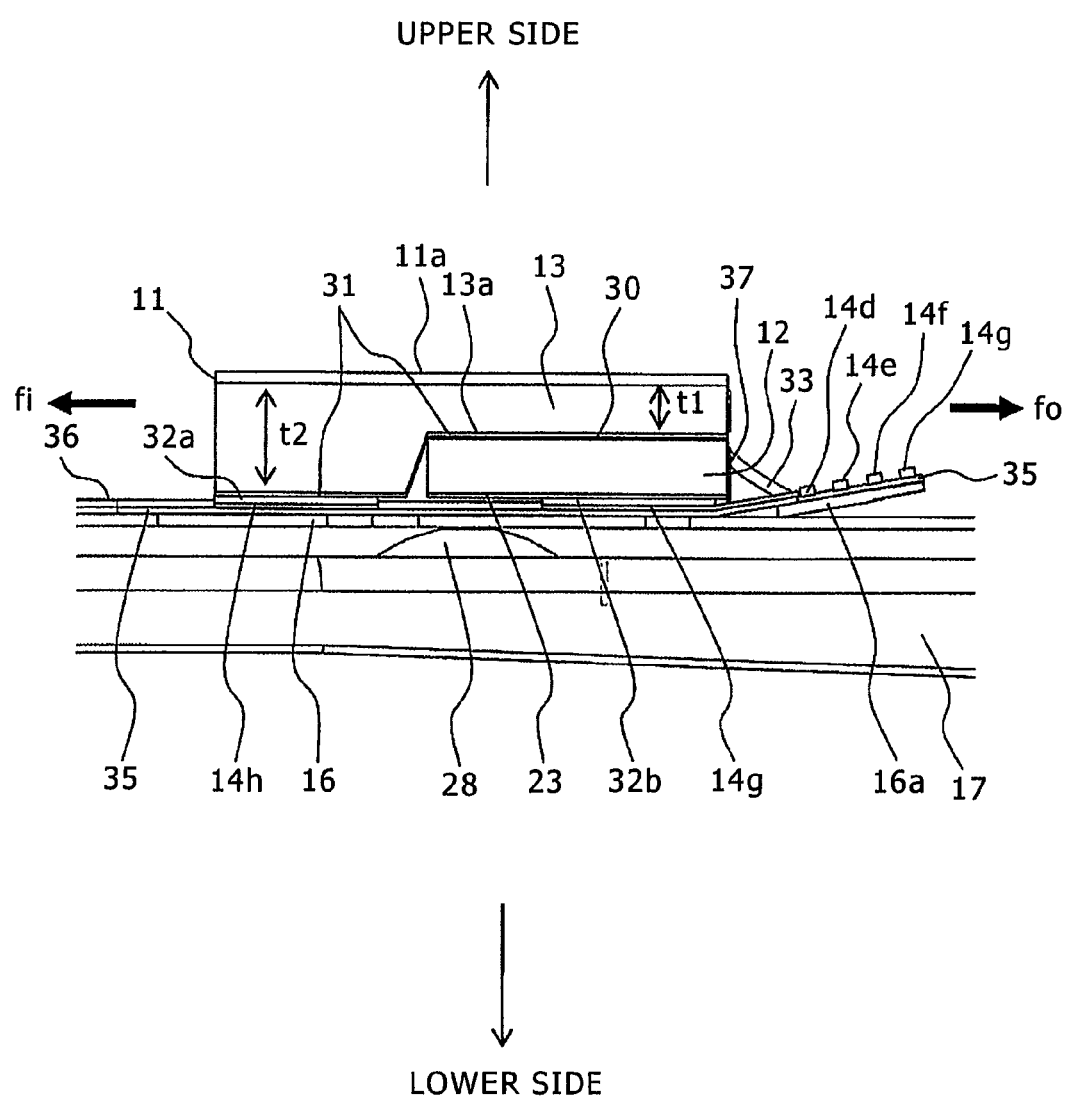
FIG. 7 is an enlarged view showing a mount structure for the laser diode of the head-gimbal-assembly according to the embodiment, on the mounting face side thereof.

If a configuration shown in FIG. 7 is adopted, heat from the lead wire 14g or the lead wire 14h, at a higher temperature, can be efficiently propagated to the other lead wires 14a to 14f via not only the trace base member 35 relatively low in thermal conductivity, but also the gimbal 16a relatively high in thermal conductivity. That is, the heat generated at the laser diode 12 can be efficiently released. As a result, it is possible to realize a thermal assisted magnetic recording head slider provided with a laser diode higher in reliability than that in the case of the embodiment described in the foregoing.

(Evaluation Results of Heat-release Characteristic)

Figure 8:
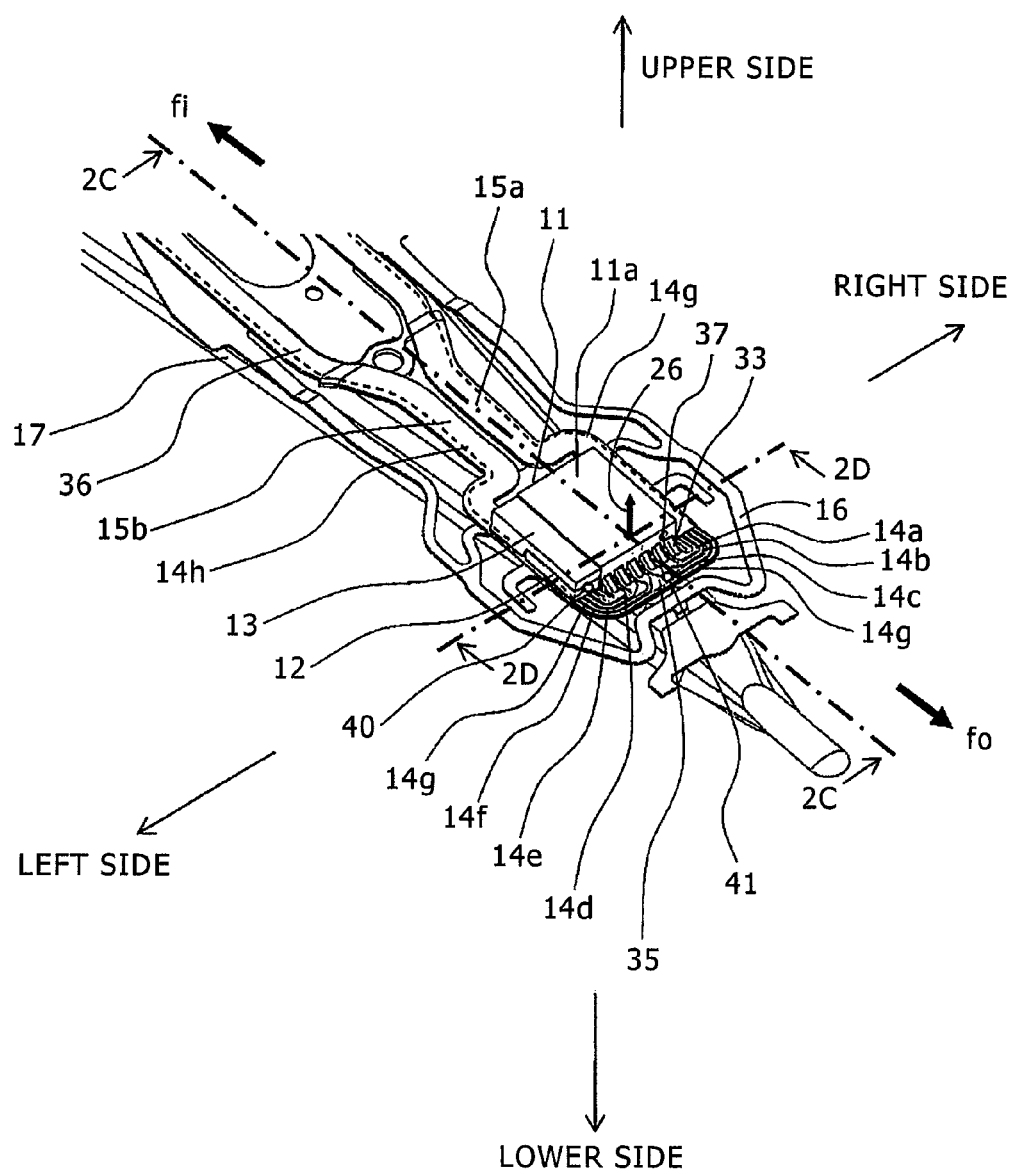
FIG. 8 is a perspective view of the head-gimbal-assembly for use in describing temperature evaluation points.
Figure 9:
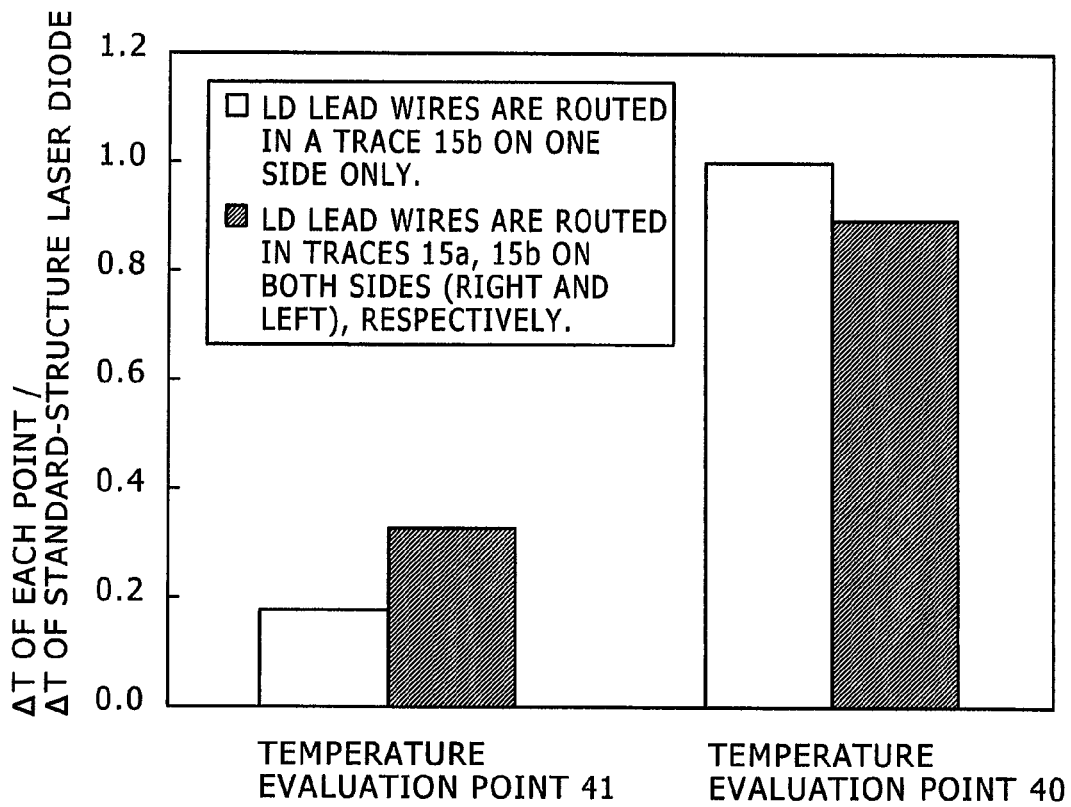
FIG. 9 is a view for describing a difference in heat-release characteristic between the case of adopting a wiring structure according to the related art and the case of adopting a wiring structure according to the present embodiment.

Referring to FIGS. 8, and 9, heat-release effects of the head-gimbal-assembly 10 according to the present embodiment are described hereinafter. FIG. 8 is an enlarged view showing the part in FIG. 2A, delineated by the circle. FIG. 8 corresponds to FIG. 2B. Accordingly, parts in FIG. 8, corresponding to those in FIG. 2B, are shown by like signs.

In FIG. 8, a temperature evaluation point 40 of the laser diode 12, and a temperature evaluation point 41 of the trace base member 35 are each indicated by a circle sign. In FIG. 8, the temperature evaluation point 40 is set on an end face of the laser diode 12 at the gas-outlet side fo. Further, the temperature evaluation point 41 is set at a position in the trace base member 35 positioned on the gas-outlet side fo of the head slider 11, in the vicinity of the lead wire 14c that is branched off into the trace 15a.

FIG. 9 is a view contradistinctively showing a difference in temperature rise at each of the temperature evaluation points, between the case of adopting a wiring structure according to the related art and the case of adopting a wiring structure according to the present embodiment. In FIG. 9, the vertical axis indicate a dimensionless temperature rise value expressed as a ratio of a temperature rise value ΔT at each of the temperature evaluation points to a temperature rise value ΔT of the laser diode 12 of the standard-structure. Herein, a value "1" means that a change in temperature at each of the temperature evaluation points is the same as a change in temperature at the laser diode 12 of the standard-structure.

In this case, by "a wiring structure according to the related art" is meant a structure where the lead wires 14g, and 14h, for power supply to the laser diode 12, are routed in the trace 15b on one-side only. Needless to say, by "a wiring structure according to the present embodiment" is meant a structure where the lead wire 14g is routed in the trace 15a, and the lead wire 14h is routed in the trace 15b.

As shown in FIG. 9, a dimensionless temperature rise value at the temperature evaluation point 41 of the trace base member 35 is found increased from 0.173 in the case of the structure according to the related art by 87% to 0.323 in the case of the present embodiment. This means an increase in heat release to the lead wires positioned on the gas-outlet side fo of the head slider 11. More specifically, this shows that the heat generated at the laser diode 12 can be dispersed to the lead wires routed to the trace 15a positioned on the opposite side of a place where the laser diode 12 is mounted.

Further, it is evident that enhancement in the heat-release efficiency has a reduction effect that a dimensionless temperature rise value at the temperature evaluation point 40 of the laser diode 12 according to the present embodiment is reduced by 10% as compared with the case of the structure according to the related art. That is, it is confirmed that the wiring structure according to the present embodiment is effective in lowering the temperature of the laser diode 12. Thus, the present embodiment can improve deterioration in the temperature characteristics of the laser diode 12 and shortening of the service life thereof due to rise in temperature, and can enhance the reliability.

(Other Embodiments)

Further, it is to be understood that the invention be not limited to the embodiments described in the foregoing and that various changes and modifications may be made in the invention without departing from the spirit and scope thereof. For example, the embodiments given in the foregoing are described in great detail for clarity; however, the invention is not limited to a form provided with all the configurations described in the foregoing. A part of the embodiment may be replaced with the configuration of another embodiment, and the configuration of another embodiment may be added to the configuration of the embodiment. Further, another configuration may be added to, deleted from, or replaced with a part of the configuration of each embodiment.

LIST OF REFERENCE SIGNS

1 . . . magnetic disk unit, 2 . . . magnetic disk media, 3 . . . spindle motor, 4 . . . actuator assembly, 5 . . . suspension, 6 . . . enclosure, 7 . . . voice coil motor, 8 . . . rotation axis, 9 . . . head assembly, 10 . . . head gimbal-assembly, 11 . . . thermal assisted magnetic recording head slider, 12 . . . laser diode, 13 . . . sub-mount, 13a . . . joined face 13a, 14a to 14H . . . lead wire, 15a, 15b, 15 . . . trace, 16 . . . gimbal, 17 . . . load beam, 18 . . . mount plate, 19 . . . optical cavity, 20a, 20b . . . corner, 21 . . . output end, 22 . . . laser light, 23 laser diode electrode, 24 . . . waveguide, 25 . . . near field transducer, 26 . . . near field light, 27 . . . magnetic write head, 28 . . . dimple, 30 . . . solder, 31 . . . sub-mount electrode, 32a, 32b . . . bonding agent, 33 . . . solder, 35 . . . trace base member, 37 . . . head slider electrode, and 40, 41 . . . temperature evaluation point.

The invention claimed is:

1. A head-gimbal-assembly comprising:
a thermal assisted magnetic recording head including:
a sub-mount having a sub-mount electrode for power supply to a laser diode;

the laser diode attached to an attachment face of the sub-mount, provided with a laser diode electrode on the other end face side of the attachment face; and a head slider having:
- a magnetic write head;
- a near field transducer for converting laser light emanated from the laser diode into near field light; and
- a head slider electrode, the head slider outputting the near field light from a plane opposed to recording media;

a gimbal supporting the thermal assisted magnetic recording head; and a plurality of lead wires formed over the gimbal, the lead wires each being branched off to the right and left sides of the head slider, on the gas inlet side thereof to advance toward the gas-outlet side of the head slider after taking a detour around the head slider to be subsequently connected to the head slider electrode, the sub-mount electrode and the laser diode electrode, wherein the sub-mount with the laser diode attached thereto is mounted on either the right or the left side lateral face of the head slider, wherein the head slider receives the laser light of the laser diode from the lateral face of the head slider, with the sub-mount mounted thereon, and wherein two lengths of the lead wires, each length thereof being connected to the sub-mount electrode and the laser diode electrode, respectively, are each branched off to the right and left sides of the head slider, on the gas inlet side thereof to advance toward the gas-outlet side of the head slider after taking a detour around the head slider, whereupon one length of the lead wire circles around the outer periphery of the head-slider electrode formed on the gas-outlet side of the head slider to be connected to the sub-mount electrode or the laser diode electrode, while the other length of the lead wire is connected to either the sub-mount electrode or the laser diode electrode, differing from either of those electrodes where the one length of the lead wire is connected, without circling around the outer periphery of the head-slider electrode formed on the gas-outlet side of the head slider.

2. The head-gimbal-assembly according to claim 1, wherein the lead wire circling around the whole periphery of the head-slider electrode formed on the gas-outlet side of the head slider is connected to the laser diode electrode.

3. The head-gimbal-assembly according to claim 1,
wherein a length of the sub-mount in the front-back direction thereof is greater than a length of the laser diode in the front-back direction thereof,
wherein a thickness in the vertical direction of the sub-mount, in a region thereof where the laser diode is not mounted, is greater than a thickness in the vertical direction of the sub-mount, in a region thereof where the laser diode is mounted, and
wherein the sub-mount electrode is integrally formed to cover a region from a face of the sub-mount, where the laser diode 12 is mounted, and up to a face of the sub-mount, where the laser diode is not mounted, to be connected to the lead wire corresponding thereto.

4. The head-gimbal-assembly according to claim 1,
wherein the plurality of the lead wires are formed on an insulating member,
wherein the insulating member is supported by the gimbal, and
wherein the gimbal is formed to reach a region on the gas-outlet side of a wiring position of the lead wire circling around the outer periphery of the head-slider electrode to be connected to the sub-mount electrode or the laser diode electrode.

5. A head assembly comprising:
the head-gimbal-assembly according to claim 1; and
a suspension.

6. A magnetic disk unit comprising in the enclosure:
magnetic disk media to be rotationally driven;
a head assembly including the head-gimbal-assembly according to claim 1; and a suspension; and
a drive mechanism rotationally supporting the head assembly against the magnetic disk media.

\* \* \* \* \*